US012722660B2

(12) United States Patent
Nakamura et al.

(10) Patent No.: US 12,722,660 B2
(45) Date of Patent: Sep. 1, 2026

(54) AUTONOMOUS MOBILE BODY AND VEHICLE SYSTEM

(71) Applicant: TOYOTA JIDOSHA KABUSHIKI KAISHA, Toyota (JP)

(72) Inventors: Masashi Nakamura, Tokyo (JP); Masahiro Iwamoto, Nisshin (JP); Takao Kataoka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 18/588,204

(22) Filed: Feb. 27, 2024

(65) Prior Publication Data

US 2024/0286647 A1 Aug. 29, 2024

(30) Foreign Application Priority Data

Feb. 28, 2023 (JP) ................................ 2023-030299

(51) Int. Cl.

| | |
|---|---|
| ***B60W 60/00*** | (2020.01) |
| ***B60L 50/60*** | (2019.01) |
| ***B60N 3/10*** | (2006.01) |
| ***B60R 16/03*** | (2006.01) |
| ***G07C 9/00*** | (2020.01) |
| ***H01M 8/04082*** | (2016.01) |

(52) U.S. Cl.

CPC ....... *B60W 60/00256* (2020.02); *B60L 50/60* (2019.02); *B60N 3/104* (2013.01); *B60R 16/03* (2013.01); *G07C 9/00896* (2013.01); *H01M 8/04208* (2013.01); *B60W 2556/45* (2020.02); *G07C 2009/0092* (2013.01); *H01M 2250/20* (2013.01)

(58) Field of Classification Search

CPC ......... B60W 60/00256; B60W 2556/45; B60L 50/60; B60N 3/104; B60R 16/03; G07C 9/00896; G07C 2009/0092; H01M 8/04208; H01M 2250/20

See application file for complete search history.

(56) References Cited

U.S. PATENT DOCUMENTS

| | | | | |
|---|---|---|---|---|
| 11,360,471 | B1 * | 6/2022 | Kalama | H04N 23/57 |
| 11,845,333 | B2 * | 12/2023 | Hirawaki | B60K 1/04 |
| 2011/0233996 | A1 | 9/2011 | Kato et al. | |
| 2018/0029436 | A1 * | 2/2018 | Zaeri | B60H 1/004 |
| 2019/0064847 | A1 * | 2/2019 | Ferguson | G06K 7/1413 |
| 2019/0085791 | A1 * | 3/2019 | Rike | F02M 21/0206 |
| 2019/0164114 | A1 | 5/2019 | Kadotani et al. | |
| 2019/0287063 | A1 * | 9/2019 | Skaaksrud | G07C 9/00571 |

(Continued)

FOREIGN PATENT DOCUMENTS

| | | |
|---|---|---|
| JP | H06-137735 A | 5/1994 |
| JP | 2011-178348 A | 9/2011 |

(Continued)

*Primary Examiner* — Peter D Nolan
*Assistant Examiner* — Mikko Okechukwu Obioha
(74) *Attorney, Agent, or Firm* — Oliff PLC

(57) ABSTRACT

An autonomous mobile body comprises a travel unit configured to move autonomously; a locker unit capable of housing an object; a first power source unit configured to supply electric power to the travel unit; and a second power source unit including at least one hydrogen cartridge, the second power source unit being configured to supply electric power to the locker unit by hydrogen filled in the hydrogen cartridge.

16 Claims, 10 Drawing Sheets

(56) References Cited

U.S. PATENT DOCUMENTS

| | | | | |
|---|---|---|---|---|
| 2021/0146795 | A1 | 5/2021 | Matsutani et al. | |
| 2021/0387540 | A1 | 12/2021 | Ohmori et al. | |
| 2022/0041299 | A1* | 2/2022 | Wankewycz | B64D 37/30 |
| 2022/0153086 | A1* | 5/2022 | Zaeri | B60H 1/322 |
| 2022/0153312 | A1* | 5/2022 | Pickett | B60P 3/20 |
| 2024/0149943 | A1* | 5/2024 | Niedert | B60W 60/001 |

FOREIGN PATENT DOCUMENTS

| | | | |
|---|---|---|---|
| JP | 2019-001382 | A | 1/2019 |
| JP | 2019-096201 | A | 6/2019 |
| JP | 2021-082042 | A | 5/2021 |
| JP | 2022-524900 | A | 5/2022 |

* cited by examiner

SERVER APPARATUS 2

CONTROLLER 21

CPU

RAM

ROM

STORAGE 22

PROGRAM

COMMUNICATION MODULE 23

INPUT/OUTPUT UNIT 24

FIG. 4

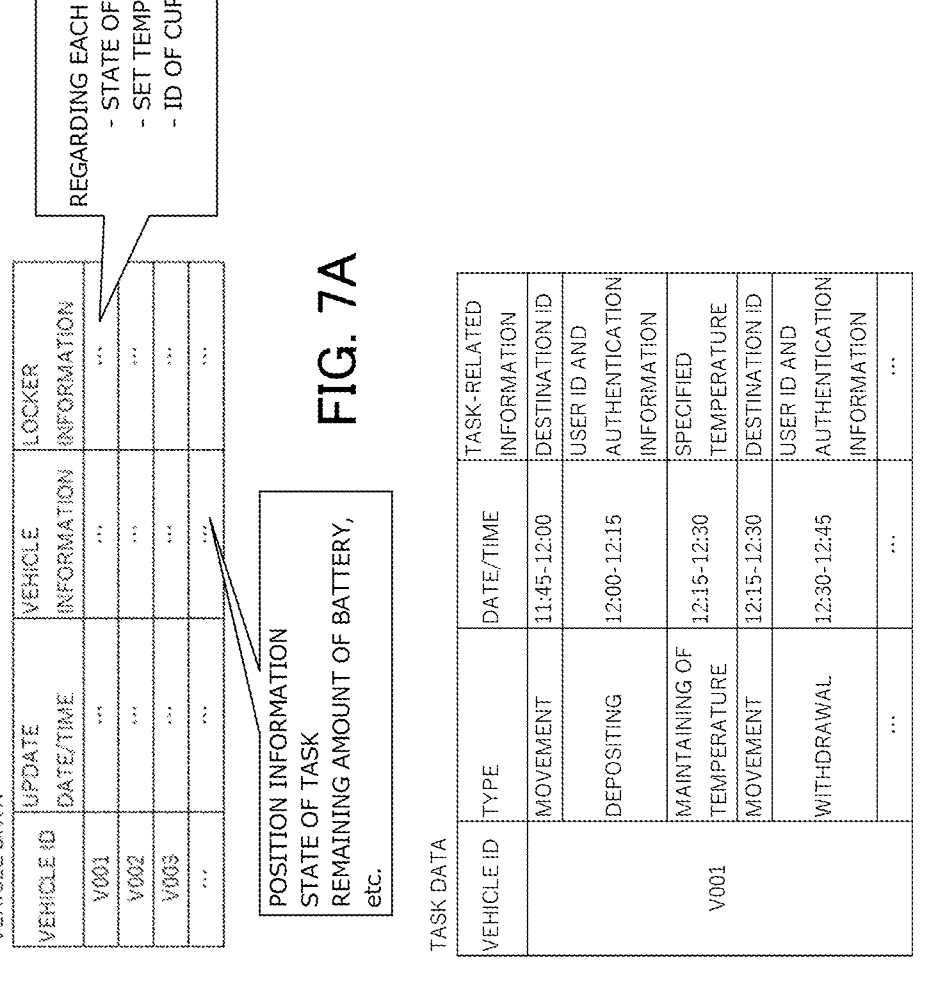

VEHICLE DATA

| VEHICLE ID | UPDATE DATE/TIME | VEHICLE INFORMATION | LOCKER INFORMATION |
| --- | --- | --- | --- |
| V001 | ... | ... | ... |
| V002 | ... | ... | ... |
| V003 | ... | ... | ... |
| ... | ... | ... | ... |

FIG. 7A

TASK DATA

| VEHICLE ID | TYPE | DATE/TIME | TASK-RELATED INFORMATION |
| --- | --- | --- | --- |
| V001 | MOVEMENT | 11:45-12:00 | DESTINATION ID |
| | DEPOSITING | 12:00-12:15 | USER ID AND AUTHENTICATION INFORMATION |
| | MAINTAINING OF TEMPERATURE | 12:15-12:30 | SPECIFIED TEMPERATURE |
| | MOVEMENT | 12:15-12:30 | DESTINATION ID |
| | WITHDRAWAL | 12:30-12:45 | USER ID AND AUTHENTICATION INFORMATION |
| | ... | ... | ... |

FIG. 7B

AUTONOMOUS MOBILE BODY AND VEHICLE SYSTEM

CROSS REFERENCE TO THE RELATED APPLICATION

This application claims the benefit of Japanese Patent Application No. 2023-030299, filed on Feb. 28, 2023, which is hereby incorporated by reference herein in its entirety.

BACKGROUND

Technical Field

The present disclosure relates to an object keeping service by a vehicle.

Description of the Related Art

There are attempts to provide services by dispatching autonomous vehicles designed for various uses. For example, Patent Literature 1 discloses an invention related to a system that allows depositing and withdrawal of luggage at various locations by operating an autonomous vehicle carrying coin-operated lockers.

[Patent Literature 1] Japanese Patent Laid-Open No. 2019-096201

[Patent Literature 2] Japanese Translation of PCT International Application Publication No. 2022-524900

[Patent Literature 3] Japanese Patent Laid-Open No. 2021-082042

SUMMARY

An object of the present disclosure is to increase convenience of an object keeping service by a vehicle.

The present disclosure in its one aspect provides an autonomous mobile body comprising: a travel unit configured to move autonomously; a locker unit capable of housing an object; a first power source unit configured to supply electric power to the travel unit; and a second power source unit including at least one hydrogen cartridge, the second power source unit being configured to supply electric power to the locker unit by hydrogen filled in the hydrogen cartridge.

The present disclosure in its another aspect provides a vehicle system comprising: an autonomous mobile body including a travel unit configured to move autonomously, and a locker unit capable of housing an object; and a server apparatus configured to instruct the autonomous mobile body to perform an operation, wherein the autonomous mobile body includes a first power source unit configured to supply electric power to the travel unit, and a second power source unit including at least one hydrogen cartridge, the second power source unit being configured to supply electric power to the locker unit by hydrogen filled in the hydrogen cartridge, and the server apparatus includes a controller configured to transmit, to the autonomous mobile body, an operation instruction specifying a first task to be performed by the travel unit and a second task to be performed by the locker unit.

Furthermore, as another aspect, there may be cited a program for causing a computer to perform a method that is performed by the autonomous mobile body or the server apparatus described above, or a non-transitory computer-readable storage medium storing the program.

According to the present invention, convenience of an object keeping service by a vehicle may be increased.

BRIEF DESCRIPTION OF THE DRAWINGS

FIG. 4 is a diagram illustrating an example of a hardware configuration of a server apparatus 2;

FIGS. 7A and 7B are examples of vehicle data 22A and task data 22B;

DESCRIPTION OF THE EMBODIMENTS

Figure 1:
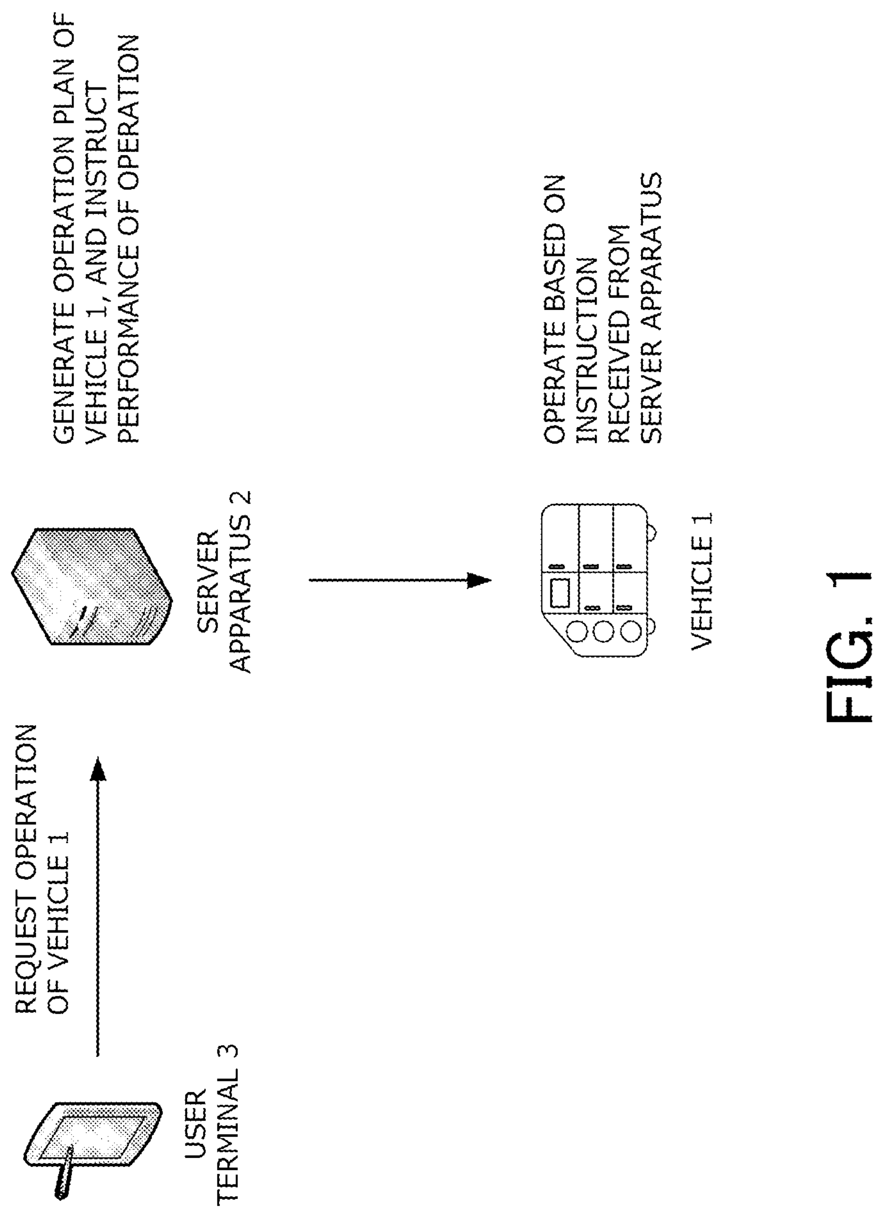
FIG. 1 is a schematic diagram of a mobile locker system according to a first embodiment.

There is proposed a system according to which a container apparatus capable of containing an object is mounted on a mobile body (autonomous mobile body) that travels autonomously using electric power as energy, and according to which the mobile body is dispatched to a user. For example, when an autonomous mobile body where a coin-operated locker is mounted is dispatched to a specified location based on a request from a user terminal, a user may deposit a package without moving.

Furthermore, the container apparatus may be provided with additional functions such as a refrigeration function, a warm keeping function, and an electronic authentication function.

In the case of mounting the container apparatus on such an autonomous mobile body, securing of electric power becomes an issue.

The autonomous mobile body and the container apparatus consume electric power during operation. However, the electric power consumed by the autonomous mobile body and the container apparatus greatly varies depending on an operation state. For example, in the case where a user requesting dispatch of the container apparatus is far away, greater electric power is needed for traveling than in a case where the user is nearby. Furthermore, in a case where fresh food or the like is deposited, inside of the container apparatus has to be maintained at a low temperature, and thus, greater electric power is needed compared to a case where a normal-temperature object is deposited.

In a case where one battery supplies electric power to each of the autonomous mobile body and the container apparatus, electric power has to be appropriately distributed. If electric power becomes insufficient during operation, a state may arise where “an object can be kept warm (cold) but traveling cannot be performed” or “traveling can be performed but an object cannot be kept warm (cold)”, for example.

However, the amount on consumption of electric power changes depending on a travel route, a travel distance, the number of objects that are deposited, a range of temperature and the like, and accurate estimation is difficult.

It is also possible to adopt a method of separately providing a battery for supplying electric power for traveling and a battery for supplying electric power to the container apparatus, but in this case, there occurs a different problem that a space in the container apparatus is reduced.

An autonomous mobile body according to the present disclosure solves such problems.

An autonomous mobile body according to an embodiment includes a travel unit configured to move autonomously; a locker unit capable of housing an object; a first power source unit configured to supply electric power to the travel unit; and a second power source unit including at least one hydrogen cartridge, the second power source unit being configured to supply electric power to the locker unit by hydrogen filled in the hydrogen cartridge.

The autonomous mobile body is typically an unmanned vehicle that moves autonomously while carrying a container apparatus (locker unit) that is capable of housing an object. The locker unit is a locker-type apparatus that includes a plurality of sections and that is capable of containing an object in each section. The plurality of sections may be separately locked and unlocked.

The autonomous mobile body where the locker unit is mounted is also referred to as a mobile locker. By operating the autonomous mobile body where the locker unit is mounted, the locker may be dispatched to a location desired by a user and an object may be received. Furthermore, an object may be delivered between a plurality of users.

The autonomous mobile body includes the first power source unit configured to supply electric power to the travel unit, and the second power source unit including at least one hydrogen cartridge, the second power source unit being configured to supply electric power to the locker unit by hydrogen that is filled.

The first power source unit is typically an electric power supply unit including a secondary battery such as a lithium-ion battery or a nickel-metal hydride battery. The second power source unit is a unit that generates electric power with hydrogen as a fuel, or in other words, a fuel cell.

Due to having high specific power density, a secondary battery such as a lithium-ion battery or a nickel-metal hydride battery can swiftly perform charging/discharging. Thanks to such a property, the secondary battery is suitable as a power source for driving a vehicle.

A fuel cell has lower specific power density than the secondary battery, but has higher energy density than the secondary battery. That is, when the weight is the same, energy can be extracted over a longer period of time than the secondary battery. Thanks to such a property, the fuel cell is suitable as a power source for constant supply (for example, a power source for providing an object keeping service, such as a power source for keeping the container apparatus warm/cold).

The autonomous mobile body according to the present disclosure is characterized in that the two power sources are independent of each other. Accordingly, a power source plan regarding traveling of the vehicle and a power source plan regarding keeping of an object may be separately made. Moreover, by using the fuel cell as the second power source unit, the power source unit may be reduced in size, and space in the container apparatus may be maximized.

Additionally, the second power source unit may allow the at least one hydrogen cartridge to be individually attached and detached.

A number of cartridges necessary for providing a service may thus be selectively mounted.

Furthermore, a side from which the hydrogen cartridge is inserted at a time of attachment to the second power source unit may be made the same as a side where the object is withdrawn from the locker unit.

For example, the hydrogen cartridge may be designed to be inserted from a same side as a side where placement/removal of an object from the locker unit is performed. In this case, when a space is secured on one side, both placement/removal of an object and replacement of the hydrogen cartridge may be performed.

Furthermore, the locker unit may further include a temperature adjustment unit that is operated by the electric power supplied. The temperature adjustment unit may be one of a cold-keeping unit or a warming unit.

One temperature adjustment unit may be provided for one locker unit, or the temperature adjustment unit may be provided for each for the plurality of sections. Temperature can be adjusted separately for each of the plurality of sections.

Hereinafter, an embodiment of the present disclosure will be described with reference to the drawings. The configuration of the embodiment described below is an example, and the present disclosure is not limited to the configuration of the embodiment.

First Embodiment

An outline of a mobile locker system according to a first embodiment will be described with reference to FIG. 1. The mobile locker system according to the present embodiment includes at least one vehicle 1 that performs autonomous traveling, and a server apparatus 2 that controls the vehicle 1. A user terminal 3 is a computer that issues a request to the server apparatus 2.

The vehicle 1 is an autonomous vehicle that travels based on an instruction from the server apparatus 2. The vehicle 1 carries a container apparatus. The container apparatus is a locker-type apparatus that includes a plurality of sections, where an object can be housed in each section. The container apparatus may be in any mode as long as an object can be housed and a lock can be applied.

Figure 2:
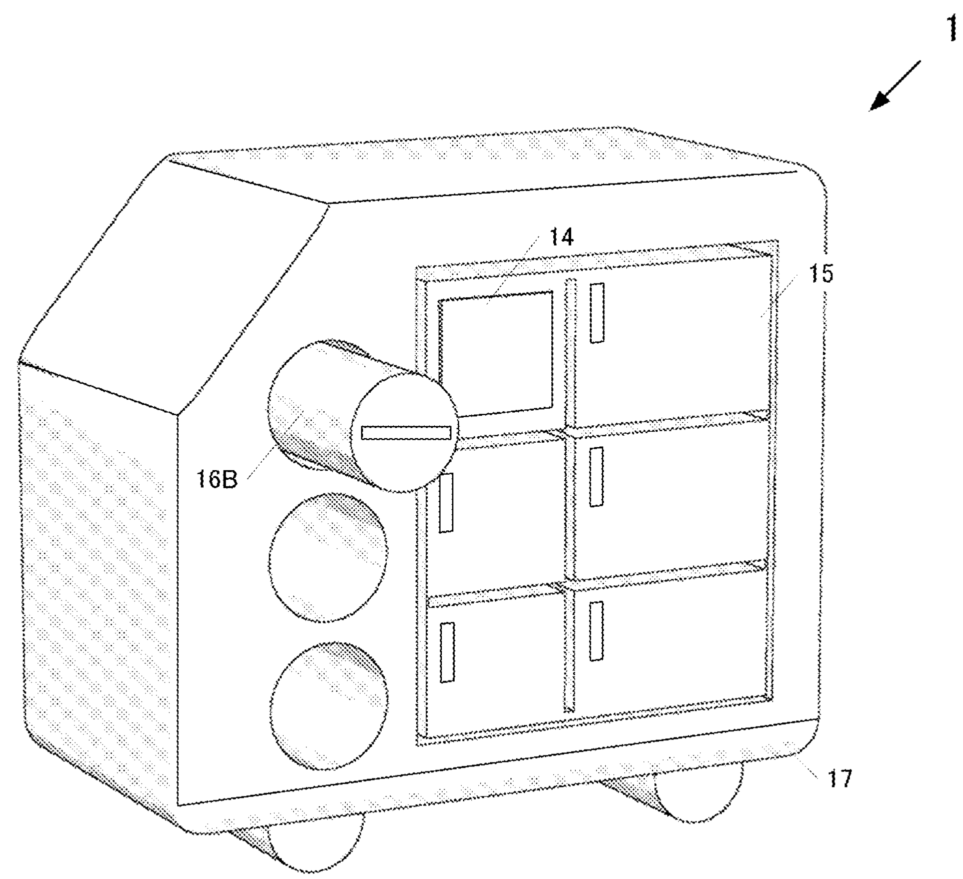
FIG. 2 is a diagram illustrating an external appearance of a vehicle 1.

FIG. 2 illustrates an external appearance of the vehicle 1. The vehicle 1 includes a drive unit 17 that is a unit that performs autonomous traveling, and a locker unit 15 where sections can be accessed through respective doors. The locker unit 15 includes a plurality of sections (five in the illustrated example).

A user who uses a service may perform an operation of unlocking a specified section by an input/output unit 14. A reference sign 16B is a cartridge that is filled with hydrogen and that is for supplying electric power to the locker unit 15 (described later).

The vehicle 1 provides a service of keeping an object (hereinafter "keeping service") by using the locker unit 15 that is mounted. A user may deposit or withdraw an object at any location by calling the vehicle 1 via the server apparatus 2. Additionally, a user who deposits an object and a user who withdraws the object may be different.

That is, the vehicle 1 may provide an object delivery service. For example, a shop may deposit a product in the vehicle 1, and a consumer who purchased the product may receive the product at home.

The server apparatus 2 is an apparatus that manages operation of the vehicle 1.

As described, the vehicle 1 may move autonomously while carrying the locker unit 15. In the case where a dispatch request for a vehicle is received from the user terminal 3 carried by a user who is to put in or take out an object, the server apparatus 2 determines the vehicle 1 to be dispatched to the user, and instructs the vehicle 1 to perform operation.

The vehicle 1, the server apparatus 2, and the user terminal 3 are interconnected by a network. As the network, a wide area network (WAN), which is a worldwide public communication network such as the Internet, or other communication networks may be adopted, for example. Furthermore, the network may include a mobile communication network for mobile phones, or a wireless communication network such as Wi-Fi (registered trademark).

Next, details of the vehicle 1 and the server apparatus 2 will be given.

The vehicle 1 is a vehicle that performs autonomous traveling by being controlled by the server apparatus 2. More specifically, the vehicle 1 determines a travel route based on an operation instruction transmitted from the server apparatus 2, and travels on a road by an appropriate method while sensing periphery of the vehicle 1. Furthermore, a predetermined task related to the keeping service (such as reception or handing over of an object) is performed at a movement destination.

The server apparatus 2 is a computer that manages a plurality of vehicles 1. The server apparatus 2 is capable of performing wireless communication with the plurality of vehicles 1, and in a case where there is a request from a user, the server apparatus 2 determines the vehicle 1 that is to be dispatched to the user, and issues an instruction to perform operation to the vehicle 1.

<Hardware Configuration>

Figure 3:
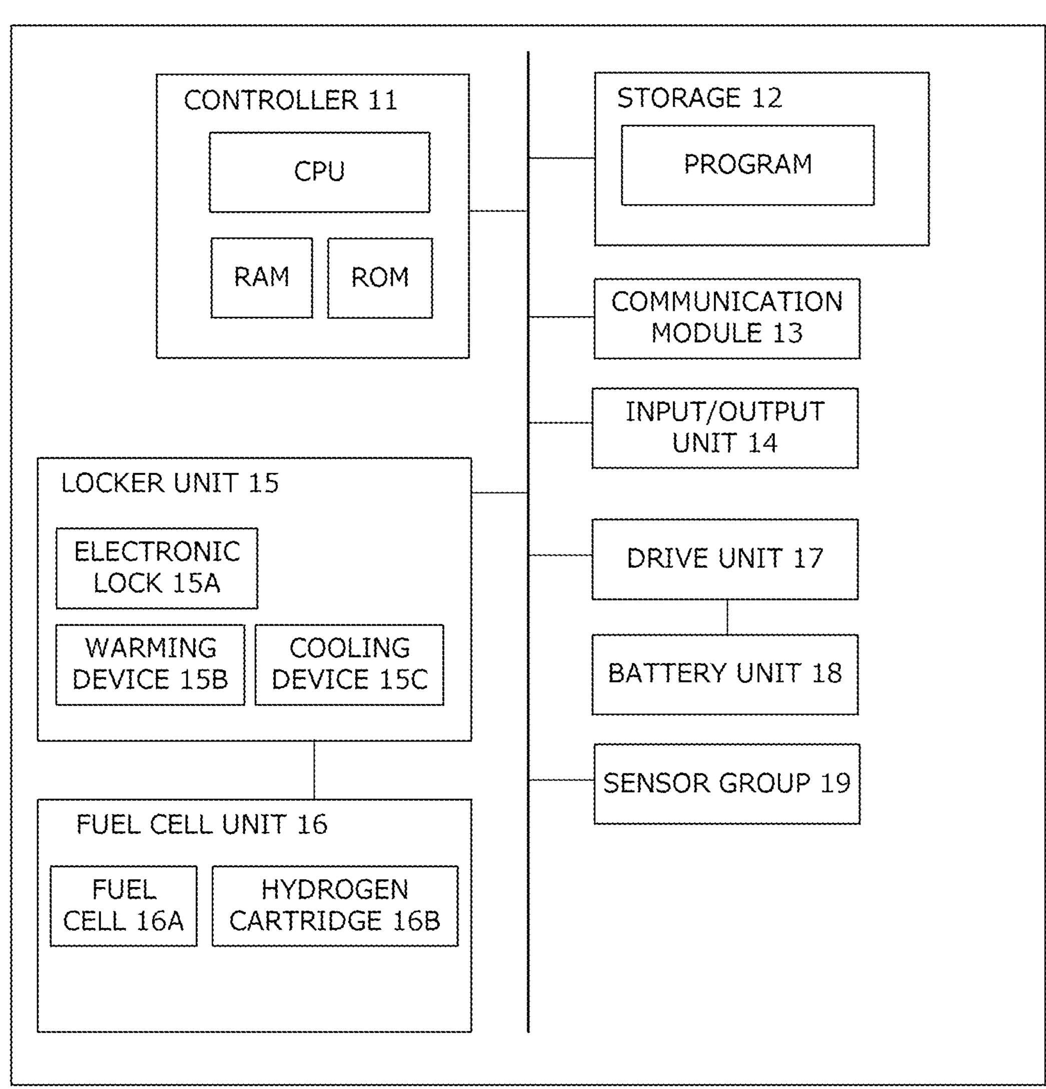
FIG. 3 is a diagram illustrating an example of a hardware configuration of the vehicle 1.

FIG. 3 is a diagram illustrating an example of a hardware configuration of the vehicle 1.

The vehicle 1 includes a controller 11, a storage 12, a communication module 13, an input/output unit 14, the locker unit 15, a fuel cell unit 16, the drive unit 17, a battery unit 18, and a sensor group 19. The locker unit 15 operates by electric power that is supplied from the fuel cell unit 16, and the drive unit 17 operates by electric power that is supplied from the battery unit 18.

The controller 11 is an arithmetic unit that implements various functions of the vehicle 1 by executing a predetermined program. For example, the controller 11 may be implemented by a hardware processor such as a CPU. Furthermore, the controller 11 may include a RAM, a read only memory (ROM), a cache memory, and the like.

The storage 12 is a unit for storing information, and is a storage medium such as a RAM, a magnetic disk, or a flash memory. The storage 12 stores programs to be executed by the controller 11, data to be used by the programs, and the like.

The communication module 13 is a communication unit for connecting the vehicle 1 to the network. In the present embodiment, the vehicle 1 is capable of communicating with another apparatus (such as the server apparatus 2) via the network by using a mobile communication service such as 3G, LTE, or 5G. Additionally, the communication module 13 may further include a communication unit for performing inter-vehicle communication with another vehicle.

The input/output unit 14 is a unit for receiving an input operation performed by a user, and for presenting information to the user. More specifically, the input/output unit 14 includes a device for performing input, such as a mouse or a keyboard, and a device for performing output, such as a display or a speaker. For example, the input/output unit 14 may be integrally formed by a touch panel display.

The locker unit 15 is a locker-type apparatus that includes a plurality of sections, and that allows an object to be housed in each section. As described with reference to FIG. 2, the locker unit 15 is formed such that the sections may be independently accessed through respective doors. The locker unit 15 includes a plurality of electronic locks 15A, and the plurality of sections may thereby be locked/unlocked.

Furthermore, the locker unit 15 includes a warming device 15B and a cooling device 15C, and is able to keep any section at a specific temperature. The warming device 15B is a device that maintains inside of a section at a temperature that is higher than a normal temperature, and the cooling device 15C is a device that maintains inside of a section at a temperature lower than the normal temperature. The cooling device 15C and the warming device 15B may be provided for each section, or one cooling device 15C and one warming device 15B may be in charge of a plurality of sections.

Each of the plurality of sections may be separately maintained at a specified temperature by these devices, and delivery of fresh food and the like is thus enabled.

Furthermore, the locker unit 15 is connected to the controller 11, and operation thereof (authentication of a user, locking/unlocking, warm keeping, cold keeping, etc.) is controlled by the controller 11. Moreover, the locker unit 15 may interact with a user via the input/output unit 14.

The fuel cell unit 16 is a unit that includes a fuel cell 16A and a hydrogen cartridge 16B. The fuel cell 16A may be a fuel cell stack that is formed by stacking a plurality of battery cells. For example, the fuel cell 16A may be a polymer electrolyte fuel cell. The fuel cell 16A generates electric power by chemical reaction between hydrogen supplied to an anode electrode and oxygen as an oxidizing gas supplied to a cathode electrode. The fuel cell 16A may include a mechanism for storing or discharging water that is generated by chemical reaction between hydrogen and oxygen.

The hydrogen cartridge 16B stores, in a compressed manner, the hydrogen to be supplied to the fuel cell 16A. As illustrated in FIG. 2, in the present embodiment, a plurality of hydrogen cartridges 16B can be mounted in the fuel cell unit 16. In the case where a plurality of hydrogen cartridges 16B are mounted, the stored hydrogen is supplied to the fuel cell 16A in a combined manner. That is, by increasing the number of hydrogen cartridges 16B that are mounted, power source capacity of the fuel cell 16A may be increased. Additionally, in the example in FIG. 2, three hydrogen cartridges 16B are mounted on the vehicle 1, but the number of hydrogen cartridges 16B that can be mounted is not limited thereto.

In the present embodiment, the warming device 15B, the cooling device 15C, and the electronic lock 15A included in the locker unit 15 are operated by the electric power supplied by the fuel cell unit 16.

Additionally, the hydrogen cartridge 16B is disposed such that a side from which the hydrogen cartridge 16B is inserted at a time of attachment is the same as a side where an object is withdrawn. Accordingly, the hydrogen cartridge may be replaced even in a small space.

The drive unit 17 is a unit for causing the vehicle 1 to travel, based on an instruction generated by the controller 11. For example, the drive unit 17 may include a motor, an inverter, a brake, and a steering mechanism for driving wheels. The drive unit 17 is coupled with the battery unit 18, and is operated by the electric power supplied by the battery unit 18. The battery unit 18 can typically be a secondary battery such as a lithium-ion battery or a nickel-metal hydride battery.

The sensor group 19 includes a plurality of sensors that perform sensing of periphery of the vehicle, and typically includes a camera, a laser scanner, a LIDAR, a radar, a GPS module, and the like. Information acquired by a sensor included in the sensor group 19 is transmitted to the controller 11. The sensor group 19 may include a camera that is provided in the vehicle 1. For example, there may be included an image capturing device that uses an image sensor such as a charged-coupled devices (CCD), a metal-oxide-semiconductor (MOS), or a complementary metal-oxide-semiconductor (CMOS).

Additionally, the controller 11, the storage 12, the communication module 13, and the input/output unit 14 may be mounted on the vehicle 1 integrally as one control device.

Figure 4:
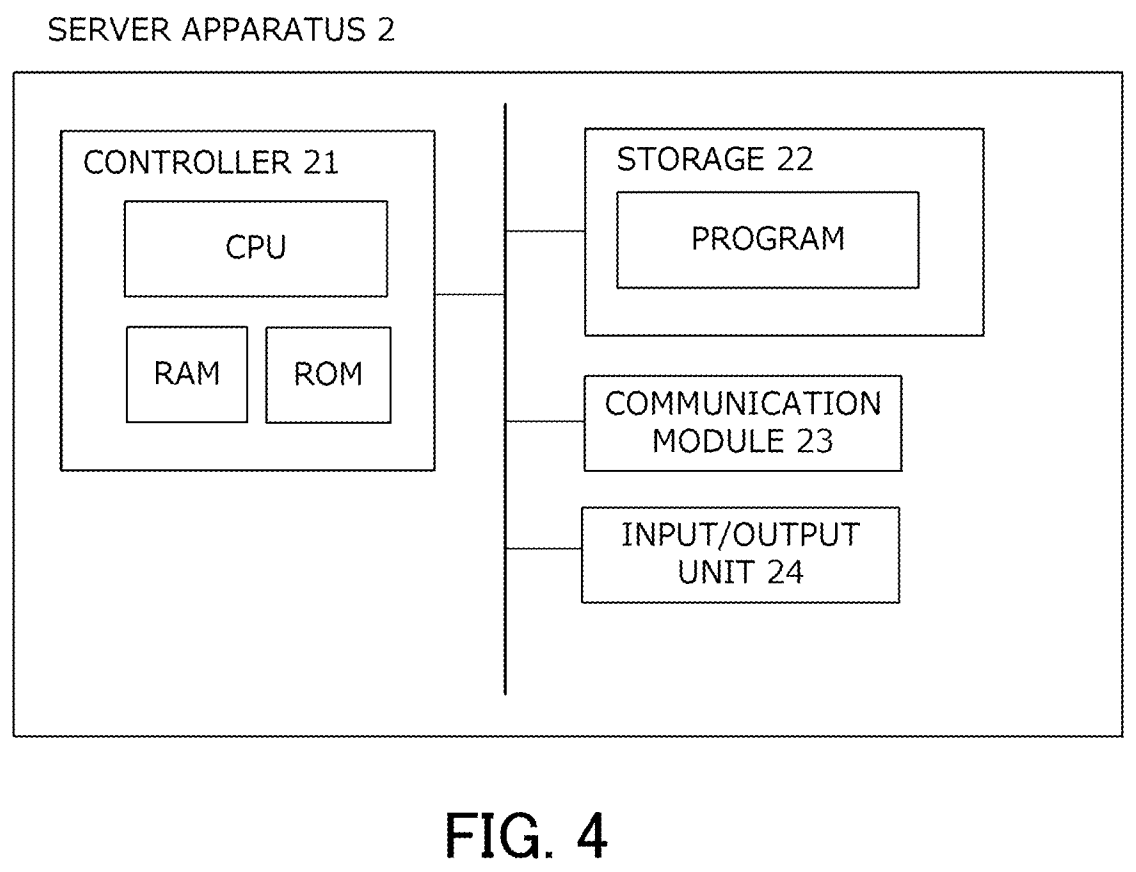

FIG. 4 is a diagram illustrating an example of a hardware configuration of the server apparatus 2.

The server apparatus 2 is a computer including a controller 21, a storage 22, a communication module 23, and an input/output unit 24.

The server apparatus 2 may be a computer including processors (CPU, GPU, and the like), main memories (RAM, ROM, and the like), and auxiliary memories (EPROM, hard disk drive, removable medium, and the like). An auxiliary memory stores an operating system (OS), various programs, various tables and the like, and each function (software module) matching a predetermined objective as described later may be implemented by executing a program stored in the auxiliary memory. Additionally, at least one or all the functions may alternatively be implemented as a hardware module by a hardware circuit such as an ASIC or an FPGA.

The controller 21 is an arithmetic unit that implements various functions of the server apparatus 2 by executing a predetermined program. For example, the controller 21 may be implemented by a hardware processor such as a CPU. Furthermore, the controller 21 may include a RAM, a read only memory (ROM), a cache memory, and the like.

The storage 22 is a unit for storing information, and is a storage medium such as a RAM, a magnetic disk, or a flash memory. The storage 22 stores programs to be executed by the controller 21, data to be used by the programs, and the like.

The communication module 23 is a communication interface for connecting the server apparatus 2 to the network. For example, the communication module 23 may include a network interface board, a wireless communication interface for wireless communication, and the like.

The input/output unit 24 is a unit for receiving an input operation performed by an operator, and for presenting information to the operator. More specifically, the input/output unit 24 includes a device for performing input, such as a mouse or a keyboard, and a device for performing output, such as a display or a speaker. For example, the input/output unit may be integrally formed by a touch panel display.

Additionally, with respect to specific hardware configurations of the vehicle 1 and the server apparatus 2, structural elements may be omitted, replaced, or added as appropriate depending on the embodiment. For example, the controller 11 or the controller 21 may include a plurality of hardware processors. The hardware processors may include a microprocessor, an FPGA, a GPU, and the like. The input/output unit 24 may be omitted, or an input/output unit other than the one illustrated (such as an optical drive) may be added. Furthermore, the server apparatus 2 may be formed from a plurality of computers. In this case, hardware configurations of the computers may be the same or different.

The user terminal 3 is a computer that is used by a user who uses the object keeping service. For example, the user terminal 3 may be a computer that is used by an individual, such as a personal computer, a smartphone, a mobile phone, a tablet computer, or a personal digital assistant. The user may access the server apparatus 2 via a web browser or application software operating on the user terminal 3, and may interact with the server apparatus 2.

<Software Configuration>

Next, a software configuration of each device forming the vehicle 1 and the server apparatus 2 will be described.

Figure 5:
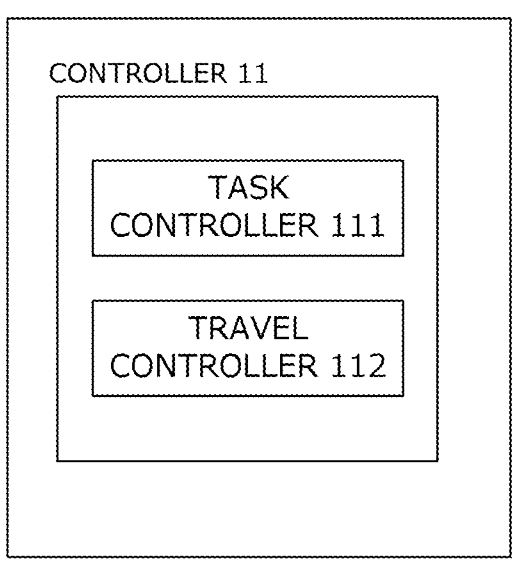
FIG. 5 is a diagram schematically illustrating a software configuration of the vehicle 1.

FIG. 5 is a diagram schematically illustrating a software configuration of the vehicle 1 according to the present embodiment. In the present embodiment, the controller 11 includes two software modules, namely, a task controller 111 and a travel controller 112. Each software module may be implemented by executing a program stored in the storage 12 by the controller 11 (CPU).

The task controller 111 performs a plurality of tasks for providing the service to a user, based on an instruction transmitted from the server apparatus 2. The tasks include a task of moving to a predetermined location, a task of receiving an object from a user, a task of keeping the section where the object is stored warm (cold), and a task of handing over the deposited object, for example. The task of handing over the object may include a task of authenticating a target user, and a task of unlocking a predetermined section of the locker unit 15. Information about a task to be performed by the task controller 111 is stored in the storage 12, and may be referred to by the travel controller 112 described later.

In the case where the task to be performed by the vehicle 1 is related to movement, the task controller 111 determines a travel route and a destination of the vehicle 1, and issues a travel instruction to the travel controller 112. For this purpose, the task controller 111 may be capable of acquiring road map data.

Furthermore, in the case where the task to be performed by the vehicle 1 is related to temperature control, the task controller 111 controls the warming device 15B or the cooling device 15C in a predetermined period of time so as to maintain a specified section at a specified temperature.

Moreover, in the case where the task to be performed by the vehicle 1 is related to provision of the keeping service, the task controller 111 identifies the user who is to put in or take out an object and a section where the object is to be contained, and controls the electronic lock 15A corresponding to the section. For example, the task controller 111 may perform a process of acquiring authentication information from the user via the input/output unit 14 and of authenticating the user, and a process of unlocking the corresponding section in the case of successful authentication, for example.

Furthermore, the task controller 111 regularly transmits data indicating a status of itself (hereinafter "status data") to the server apparatus 2.

For example, the status data includes the following information.

Identifier of the vehicle 1

Current position of the vehicle 1

Information about tasks completed until now

Information about remaining tasks

Remaining amount of hydrogen stored in the hydrogen cartridge 16B

Remaining amount (SOC) of the battery unit 18 or mileage

Information about the operation route (if during operation)

Information about an object contained in the locker unit 15

The server apparatus 2 may update data about the vehicle based on the received status data.

The travel controller 112 performs control of causing the vehicle 1 to travel autonomously. The travel controller 112 may detect an environment surrounding the vehicle based on data acquired by the sensors included in the sensor group 19, and may control autonomous traveling of the vehicle by using position information of the subject vehicle, the road map data, and the like. Targets of detection include, but are not limited to, number and positions of lanes, number and positions of vehicles present in the periphery of the subject vehicle, number and positions of obstacles (such as pedestrians, bicycles, structures, buildings, etc.) present in the periphery of the subject vehicle, a structure of the road, road signs, and the like. A target of detection may be anything that is necessary to perform autonomous traveling.

The travel controller 112 causes the subject vehicle to travel along a predetermined route while not allowing an obstacle to enter a predetermined safety region around the subject vehicle. A known method may be used as the method of causing the vehicle to travel autonomously.

Figure 6:
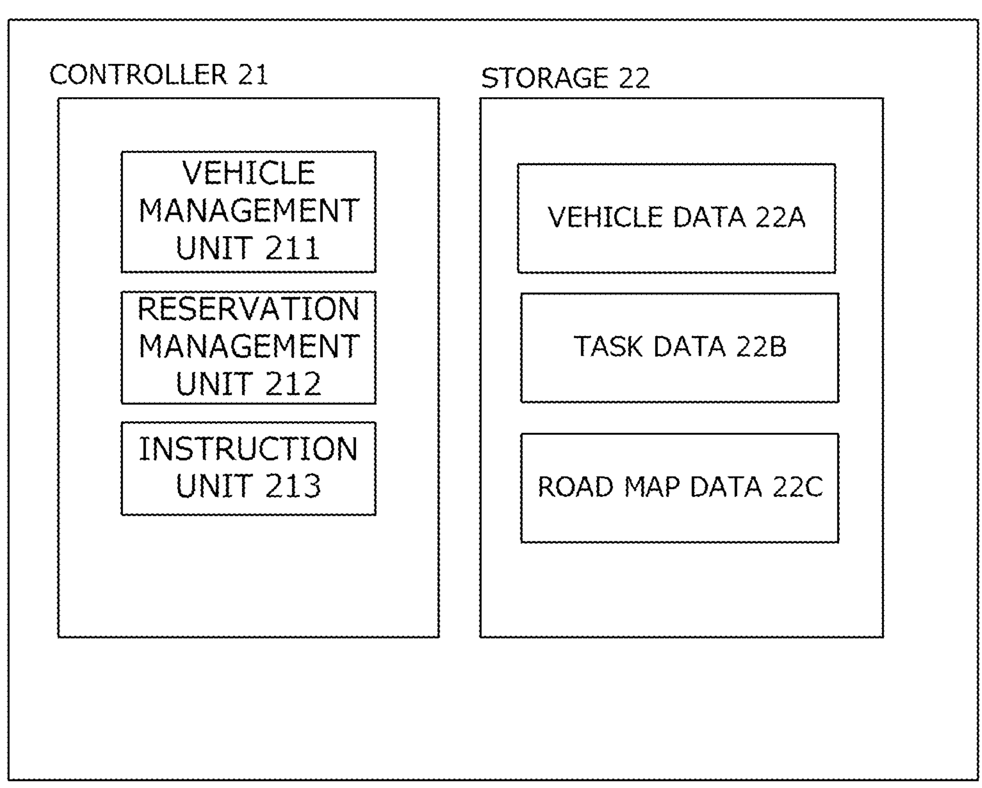
FIG. 6 is a diagram schematically illustrating a software configuration of the server apparatus 2.

FIG. 6 is a diagram schematically illustrating a software configuration of the server apparatus 2 according to the present embodiment. In the present embodiment, the controller 21 includes three software modules, namely, a vehicle management unit 211, a reservation management unit 212, and an instruction unit 213. Each software module may be implemented by execution of a program stored in the storage 22 by the controller 21 (CPU).

The vehicle management unit 211 collects information about the vehicle 1, and updates a vehicle database structured in the storage 22. The vehicle database is a database managing information about the vehicle 1 that is being managed by the system. The vehicle management unit 211 regularly performs communication with a plurality of vehicles 1, and collects the status data described above. The collected data is reflected in the vehicle database described later.

The reservation management unit 212 receives, from the user terminal 3, a request to deposit or withdraw an object (that is, a request for dispatch of the vehicle; in the following, "vehicle dispatch request"). Additionally, the reservation management unit 212 may perform a service of receiving the vehicle dispatch request by performing interaction with the user terminal 3.

The vehicle dispatch request may include information indicating locations of depositing and withdrawing an object, dates/times of depositing and withdrawal, and a temperature range in which the object is maintained. Furthermore, these information pieces may be received from the user terminal 3 together with the vehicle dispatch request. The temperature range may be ranges such as "normal temperature", "cold-storage", and "freezer", or may specify a specific temperature (such as "0 degrees C. to 4 degrees C.").

Additionally, the vehicle dispatch request may request one of depositing and withdrawal of an object, or may simultaneously request both. In the case of simultaneously requesting both, the vehicle dispatch request may include location and date/time of depositing, and location and date/time of withdrawal.

In the case where the vehicle dispatch request is received, the reservation management unit 212 determines dispatch destination and schedule of the vehicle 1 based on the vehicle dispatch request, and generates an operation instruction for the vehicle 1.

The operation instruction is data instructing the vehicle 1 as to an order of execution of tasks to be executed.

For example, the tasks are a task of moving to a predetermined location, a task of receiving an object from a user, and a task of handing over the object to a user.

When the reservation management unit 212 generates an operation instruction combining a plurality of tasks, and the vehicle 1 sequentially completes the tasks according to the operation instruction, the service by the mobile locker may be provided.

In the case where a task is related to movement, a destination and a schedule may be associated with the task. The vehicle 1 may operate according to the specified schedule, through the specified destination.

Furthermore, in the case where a task is related to depositing or withdrawal of an object, the reservation management unit 212 may generate authentication information to be used for user authentication. For example, the reservation management unit 212 may generate first authentication information and second authentication information to be checked against the first authentication information, and may transmit the first authentication information to the vehicle 1, in association with the task.

Furthermore, the second authentication information may be transmitted to the user terminal 3. The first authentication information is stored by the vehicle 1. Furthermore, the second authentication information is input to the vehicle 1 by the user. The vehicle 1 may perform user authentication by checking the two against each other, and may allow transfer of the object.

Additionally, at the time of generating the operation instruction, the reservation management unit 212 preferably determines whether the service can be provided or not, by taking into account the remaining amount of battery (the battery unit 18) for driving of the target vehicle and the remaining amount of fuel cell 16A. More specifically, provision of the service may be determined to be possible in a case where traveling to a location specified by the user is possible and the locker can be kept warm/cold during a period of time when the object is kept.

In the case where the service cannot be provided, methods as below may be adopted.

(Method 1) Use a Substitute Vehicle.

A substitute vehicle may be prepared if an object is not yet received from the user.

(Method 2) Propose Addition/Replacement of Hydrogen Cartridge.

In the case where the remaining amount of the battery unit 18 is sufficient but the remaining amount of fuel cell 16A is not sufficient, it is possible to propose addition or replacement of the hydrogen cartridge 16B with respect to the corresponding vehicle.

(Method 3) Propose re-placement of object.

In the case where an object is already received from the user and the remaining amount of the battery unit 18 is not sufficient, it is possible to propose re-placing the object on a substitute vehicle.

The instruction unit 213 transmits the generated operation instruction to the target vehicle 1. The vehicle 1 travels autonomously according to the operation instruction transmitted from the server apparatus 2, and provides the service to the user.

The storage 22 stores vehicle data 22A, task data 22B, and road map data 22C.

The vehicle data 22A is data recording a status of the vehicle 1 that is being managed by the server apparatus 2. FIG. 7A is an example of the vehicle data 22A. The vehicle data 22A includes fields of identifier of the vehicle, update date/time, vehicle information, and locker information.

The vehicle information field stores data indicating a current state of the vehicle 1. More specifically, the vehicle information field stores position information of the vehicle 1, information about a task completed by the vehicle 1 before a current time point, information about a task that is to be performed by the vehicle 1, the remaining amount of battery and mileage of the vehicle 1, information about a scheduled route of the vehicle 1, and the like.

The locker information field stores data about a state of the locker unit. More specifically, the locker information field stores a state (available or used) of each section, a set temperature, an identifier of a user who uses each section, and the like.

The vehicle data 22A is regularly updated by the status data transmitted from the vehicle 1.

The task data 22B is data recording a plurality of tasks generated by the reservation management unit 212.

FIG. 7B is an example of the task data 22B. The task data 22B is defined for each vehicle, and includes an identifier of the vehicle, the type of a task, date/time when the task is performed, and task-related information. The type of a task is "movement", "depositing", "maintaining of temperature", "withdrawal", or the like, for example.

The task-related information is a collection of additional information for performing a task. In the case where a task is related to movement, the task-related information may record an identifier of the destination or a movement route. Furthermore, in the case where a task is related to depositing or withdrawal of a package, the task-related information may record an identifier of a user, and authentication information for authenticating the user.

Furthermore, in the case where a task is related to maintaining of temperature, the task-related information may record a specified temperature.

The vehicle 1 provides the service to a user by performing, in the order of specified dates/times, the tasks included in the operation instruction transmitted from the server apparatus 2.

In the illustrated example, it is indicated that a vehicle with an identifier V001 performs the following.

(1) Move to a predetermined location between 11:45 and 12:00.

(2) Receive an object from a user between 12:00 and 12:15.

(3) Move to a predetermined location while maintaining the temperature between 12:15 and 12:30.

(4) Hand over the object to a user between 12:30 and 12:45.

The road map data 22C is a database storing data about a road network where the vehicle 1 travels. The road map data 22*c* stores a definition of a plurality of road segments, position information of each road segment, connection relationships, and the like. A road segment is obtained by dividing a road where the vehicle 1 is able to travel into predetermined unit sections. These data pieces are used at the time of determining a dispatch location of the vehicle 1.

Next, a method of providing the keeping service by the mobile locker system according to the present embodiment will be described.

Figure 8:
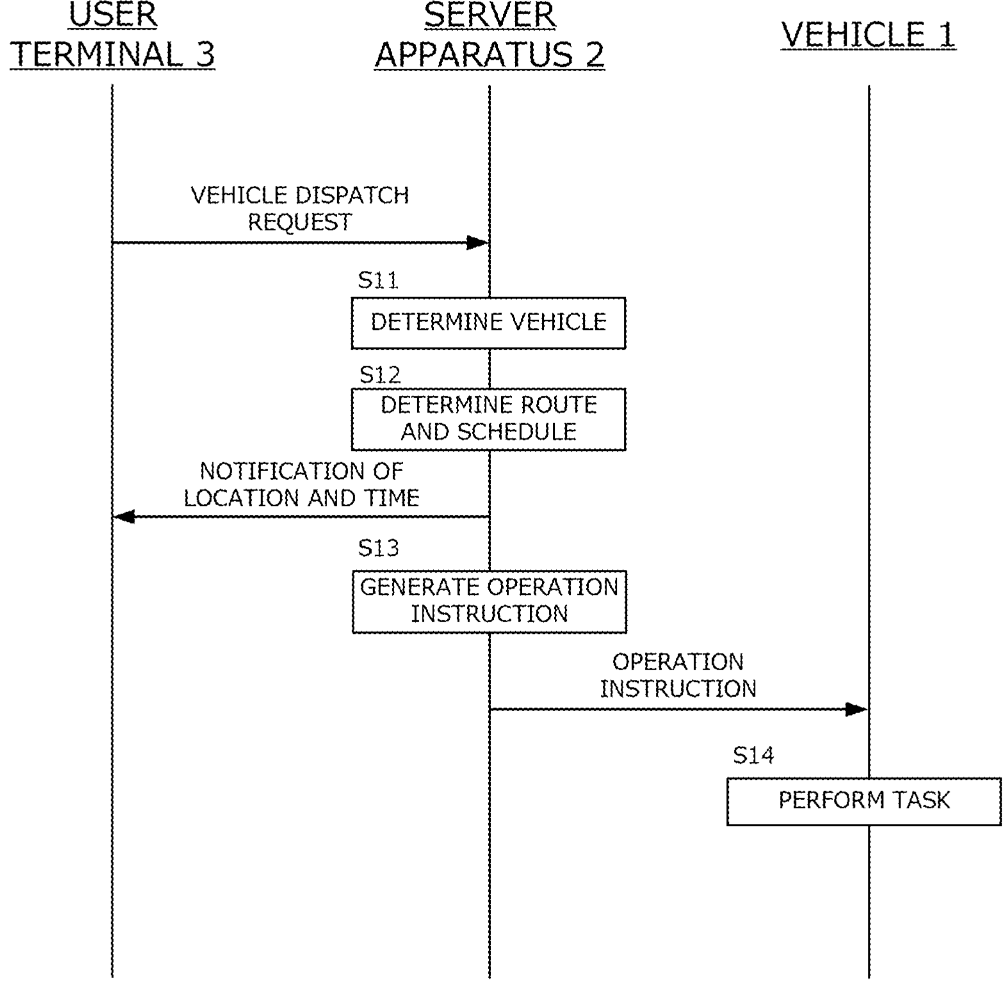
FIG. 8 is a sequence diagram of processes that are performed by the mobile locker system.

FIG. 8 is a sequence diagram of processes that are performed by the structural elements included in the system.

Additionally, during operation, the vehicle 1 regularly generates the status data, and transmits the same to the server apparatus 2. The status data includes, in addition to the state of the vehicle 1, information about a task that is completed before a current time point, information about an object that is contained in the locker unit 15, and the like. The server apparatus 2 (the vehicle management unit 211) receiving the status data updates the vehicle data 22A based on the status data received. At a timing of start of the processing illustrated in FIG. 8, it is assumed that the latest vehicle data 22A is held by the server apparatus 2 based on the status data collected from a plurality of vehicles 1 being managed.

A user who wants to deposit/withdraw an object accesses the server apparatus 2 through the user terminal 3, and issues the vehicle dispatch request. The vehicle dispatch request may include the type of request ("depositing" or "withdrawal"), a location to which the vehicle 1 is desired to be dispatched, a time slot when dispatch of the vehicle 1 is desired, information about a temperature range in which the object is to be kept, and the like. For example, the vehicle dispatch request may be generated by accessing a web server provided by the controller 21 (the reservation management unit 212), by using a web browser of the user terminal 3. For this purpose, the reservation management unit 212 may generate a user interface to be provided to the user terminal 3.

In step S11, the controller 21 (the reservation management unit 212) determines the vehicle 1 to be dispatched to the user, based on the vehicle dispatch request received from the user terminal 3. Additionally, in the case where the type of the request is "withdrawal", the vehicle 1 keeping the target object is determined to be the dispatch target. In other cases, the vehicle 1 to be dispatched to the user is determined by referring to contents of the vehicle dispatch request and the vehicle data 22A. More specifically, the vehicle 1 that can be dispatched to a specified area in a specified time slot and that carries the locker unit 15 that can keep the object in a specified temperature range is determined to be the dispatch target.

Figure 9:
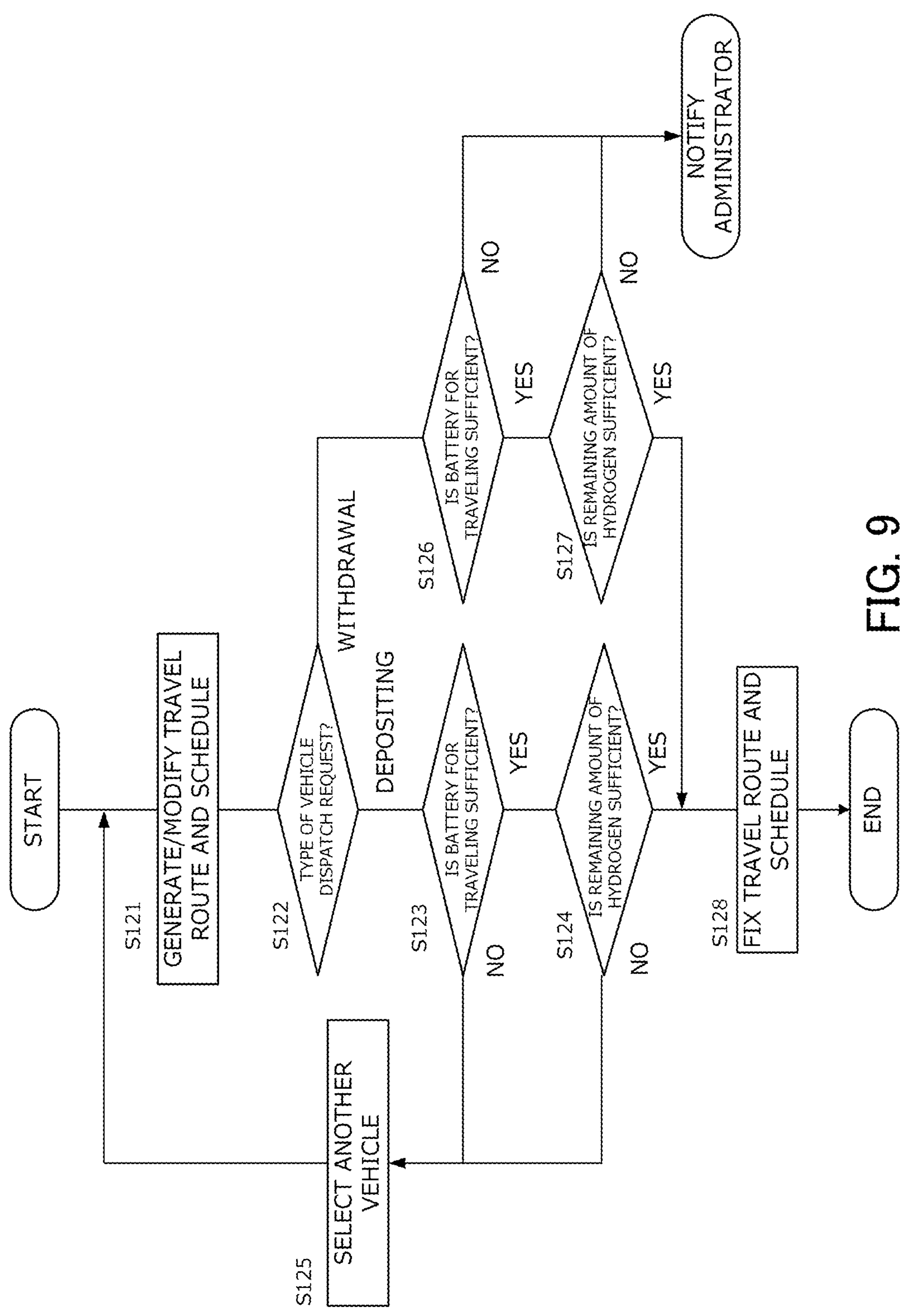
FIG. 9 is a flowchart for determining, by the server apparatus 2, a travel route and a schedule of the vehicle 1.

In step S12, the controller 21 (the reservation management unit 212) determines the operation route and the schedule for the vehicle 1 determined in step S11. FIG. 9 is a flowchart illustrating in detail processes that are performed by the controller 21 (the reservation management unit 212) in step S12.

First, in step S121, a travel route and a schedule for moving to a specified location on a specified date/time are generated. The travel route and the schedule generated here are provisional and are for evaluation. Additionally, in the case where the target vehicle 1 is being operated, the route and the schedule associated with the operation may be modified.

Next, in step S122, the type of the vehicle dispatch request is determined. In the case where the vehicle dispatch request is related to depositing of an object, the process proceeds to step S123. In the case where the vehicle dispatch request is related to withdrawal of an object, the process proceeds to step S126.

In step S123, whether the remaining amount of battery for traveling is sufficient, or in other words, whether the specified location can be reached with the current remaining amount of battery, is determined.

In the present step, the amount of electric power that is consumed by the task of "moving to a destination" is calculated, and whether the calculated amount of electric power can be supplied by the battery unit 18 is determined.

In the case where it is determined that the calculated amount of electric power cannot be supplied by the battery unit 18, the process proceeds to step S125, and another vehicle is selected. In the case where it is determined that the calculated amount of electric power can be supplied, the process proceeds to step S124.

In step S124, whether the remaining amount of fuel cell for keeping warm (cold) is sufficient, or in other words, whether the object can be kept warm (cold) with the current remaining amount of hydrogen, is determined.

In the present step, the amount of electric power that is consumed by the task of "maintaining temperature of an object" is calculated, and whether the calculated amount of electric power can be supplied by the fuel cell 16A is determined. The amount of electric power is the amount of electric power that is consumed in a period (keeping period) from reception to handing over of the object. Additionally, in the case where the keeping period for the object is not known, a provisional value (such as 24 hours) may be used as the keeping period.

In the case where it is determined that the amount of electric power for keeping warm (cold) cannot be supplied, the process proceeds to step S125, and another vehicle is selected. In the case where it is determined that the amount of electric power for keeping warm (cold) can be supplied, the process proceeds to step S128.

In step S128, the operation route and the schedule generated in step S121 are formally fixed.

In the case where the target task is "withdrawal" in step S122, whether the remaining amount of battery for traveling is sufficient, or in other words, whether the specified location can be reached with the current remaining amount of battery, is determined in step S126. In the case where it is determined that the battery for traveling is not sufficient, it is indicated that the deposited object cannot be delivered. In this case, the controller 21 issues a notification to an administrator. In the case where it is determined that the battery for traveling is sufficient, the process proceeds to step S127.

In step S127, whether the remaining amount of fuel cell for keeping warm (cold) is sufficient, or in other words, whether the object can be kept warm (cold) in a period until handing over with the current remaining amount of hydrogen, is determined. In the case where it is determined that the amount of electric power for keeping warm (cold) cannot be supplied, it is indicated that the deposited object cannot be managed at an appropriate temperature in the period until handing over. In this case, the controller 21 issues a notification to the administrator. The notification may be for urging replacement of the hydrogen cartridge. In the case where hydrogen for the fuel cell is not sufficient, operation can be continued by replacing the hydrogen cartridge. In this case, the administrator may issue an instruction to perform an operation of replacing the hydrogen cartridge. That is, the remaining amount of fuel cell may be recovered by adding a task "replace the hydrogen cartridge at a predetermined site".

In the case where it is determined that the remaining amount of hydrogen for keeping warm (cold) is sufficient, the process proceeds to step S128.

A description will be further given by referring back to FIG. 8.

When the operation route and the schedule are determined in step S12, the server apparatus 2 notifies the user terminal 3 of the location and date/time of arrival of the vehicle 1. Then, the controller 21 (the instruction unit 213) generates an operation instruction for causing the target vehicle to perform a task, and transmits the same.

Figure 10:
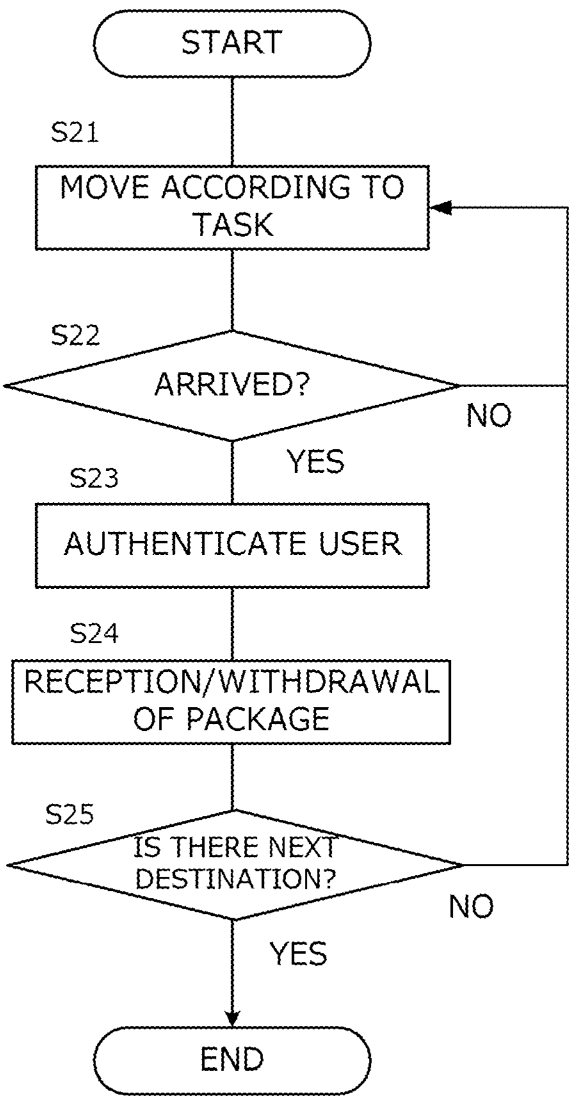
FIG. 10 is an example of a flowchart of processes that are performed by the vehicle 1 in a case where an operation instruction is received.

FIG. 10 is a flowchart of processes that are performed by the vehicle 1 in a case where an operation instruction is received.

The vehicle 1 receiving an operation instruction performs a task based on the operation instruction. In the case where the task to be performed is related to movement, the vehicle 1 (the controller 11) starts to travel toward the destination specified by the task (step S21).

When the vehicle 1 arrives at the destination (step S22: Yes), the controller 11 performs reception of an object ("depositing" from the standpoint of the user) or handing over ("withdrawal" from the standpoint of the user). Additionally, after arrival of the vehicle 1, the controller 11 may transmit a message to a mobile terminal or the like carried by the user to call over the user.

When the user arrives at the vehicle 1, the controller 11 acquires the second authentication information via the input/output unit 14 in step S23, and checks the same against the first authentication information stored in the storage 12. The second authentication information may be acquired in the form of text data via a keyboard or a touch panel, or may be acquired in the form of image data via a camera or a scanner, or may be acquired from the user terminal 3 via wireless communication. Furthermore, in the case where IC card information is registered in advance, the IC card information may be read using a card reader or the like, and successful authentication may be determined in a case where information that is registered in advance is matched.

In the case where it is confirmed as a result that the first authentication information and the second authentication information match each other, the controller 11 unlocks the corresponding section. The user is thus able to deposit or withdraw the object (step S24). Additionally, the server apparatus 2 is notified of withdrawal of the object via the status data that is regularly transmitted from the vehicle 1.

When an object is deposited, the controller 11 starts adjustment of the temperature of the corresponding section. For example, in the case where the task that is performed is "depositing", the controller 11 starts to keep the temperature of the section according to a specified temperature range. Furthermore, when the object is withdrawn, the controller 11 stops adjustment of the temperature of the corresponding section. For example, in the case where the task that is performed is "withdrawal", the controller 11 stops maintaining the temperature of the section according to the specified temperature range.

Additionally, at the timing of withdrawal of the object, the vehicle 1 (the controller 11) or the server apparatus 2 (the controller 21) may receive payment of a fee. The fee may be a fee for keeping the object, or may be a price of the object. That is, an operator providing the keeping service may receive payment of a fee instead of a seller.

Next, the controller 11 determines whether there is a next destination or not, based on the operation instruction (step S25), and in the case where there is a next destination, operation is continued. In the case where there is no next destination, return to a predetermined site is performed.

As described above, the vehicle 1 according to the present embodiment includes a first power source unit that supplies electric power to a travel unit, and a second power source unit including at least one hydrogen cartridge, the second power source unit being for supplying electric power to a locker unit by hydrogen that is filled. According to such a configuration, a power source plan regarding traveling of the vehicle and a power source plan regarding storing of an object may be separately made.

Moreover, because the hydrogen cartridge is used as an energy source for keeping an object warm/cool, replacement can be easily performed.

(Modification)

The embodiment described above is merely an example, and the present disclosure may be modified as appropriate within the scope of the present disclosure.

For example, processes and units described in the present disclosure may be freely combined to the extent that no technical conflict exists.

Furthermore, in the description of the embodiment, a locker-type apparatus including a plurality of sections is illustrated, but the apparatus to be mounted on the vehicle 1 does not have to be the locker-type apparatus as long as an object can be housed and kept.

Furthermore, in the description of the embodiment, a warming device and a cooling device are illustrated as apparatuses that consume electric power at the locker unit 15, but the locker unit 15 may also include other devices as long as the devices operate on electric power from the fuel cell.

Furthermore, in the description of the embodiment, the server apparatus 2 performs the process illustrated in FIG. 9 at a timing when the vehicle dispatch request is received, but the server apparatus 2 may regularly perform the process of determining the remaining amount of the battery for traveling (or the fuel cell). Furthermore, in the case where it is determined in the process that the service cannot be continued due to reduction in the remaining amount of the fuel cell, the server apparatus 2 may issue a notification to the administrator to urge replacement of the hydrogen cartridge.

Furthermore, the process of determining the remaining amount of the battery for traveling (or the fuel cell) may be performed by the vehicle 1. In the case where it is determined in the process that the service cannot be continued due to reduction in the remaining amount of the fuel cell, the vehicle 1 may issue a notification to the server apparatus 2 or the administrator to urge replacement of the hydrogen cartridge.

Furthermore, in the description of the embodiment, a mode in which a product to be sold to a user is delivered by the locker unit 15 is described as an example, and settlement of payment for the product may be performed at the vehicle 1 at the time of delivery of the product. For this purpose, the locker unit 15 may further include a settlement unit for receiving electronic payment. The settlement unit is a device that includes an IC card reader, an NFC reader, a barcode reader or the like, and that receives payment for a product based on information that is read (electronic money information, credit card information). The device transmits information that is read to a settlement server.

In the case of the mode, the server apparatus 2 may acquire, by the vehicle dispatch request, settlement-related information (such as information for identifying a seller of a product, information specifying price of the product). Furthermore, tasks generated based on the vehicle dispatch request may include a task "receive payment for a product". Moreover, the task of handing over an object to the user may be performed after completion of the settlement task.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An autonomous mobile body comprising:

a travel unit configured to move autonomously;

a locker unit capable of housing an object;

a first power source unit configured to supply electric power to the travel unit; and a second power source unit including at least one hydrogen cartridge, the second power source unit being configured to supply electric power to the locker unit by hydrogen filled in the hydrogen cartridge, wherein:

the second power source unit allows the at least one hydrogen cartridge to be individually attached and detached, and a side from which the hydrogen cartridge is inserted at a time of attachment to the second power source unit is same as a side where the object is withdrawn from the locker unit.

2. The autonomous mobile body according to claim 1, wherein the locker unit includes a plurality of sections that can be separately locked and unlocked.

3. The autonomous mobile body according to claim 2, wherein the locker unit further includes a temperature adjustment unit that is operated by the electric power supplied by the second power source unit.

4. The autonomous mobile body according to claim 3, wherein the temperature adjustment unit is one of a cold-keeping unit or a warming unit.

5. The autonomous mobile body according to claim 3, wherein temperature can be adjusted separately for each of the plurality of sections.

6. The autonomous mobile body according to claim 1, wherein the locker unit further includes a settlement unit configured to receive payment for the object that is housed.

7. The autonomous mobile body according to claim 2, further comprising a controller configured to control a task that is performed by the travel unit and the locker unit.

8. The autonomous mobile body according to claim 7, wherein the task includes at least one of a task of moving to a predetermined location, a task of performing authentication of a user at the predetermined location, and a task of unlocking a target section based on a result of the authentication.

9. A vehicle system comprising:

an autonomous mobile body including a travel unit configured to move autonomously, and a locker unit capable of housing an object; and a server apparatus configured to instruct the autonomous mobile body to perform an operation, wherein the autonomous mobile body includes a first power source unit configured to supply electric power to the travel unit, and a second power source unit including at least one hydrogen cartridge, the second power source unit being configured to supply electric power to the locker unit by hydrogen filled in the hydrogen cartridge, the server apparatus includes a controller configured to transmit, to the autonomous mobile body, an operation instruction specifying a first task to be performed by the travel unit and a second task to be performed by the locker unit, the second power source unit of the autonomous mobile body allows the at least one hydrogen cartridge to be individually attached and detached, and a side from which the hydrogen cartridge is inserted at a time of attachment to the second power source unit of the autonomous mobile body is same as a side where the object is withdrawn.

10. The vehicle system according to claim 9, wherein the locker unit of the autonomous mobile body includes a plurality of sections that can be separately locked and unlocked.

11. The vehicle system according to claim 10, wherein the locker unit of the autonomous mobile body further includes a temperature adjustment unit that is operated by the electric power supplied by the second power source unit.

12. The vehicle system according to claim 11, wherein the temperature adjustment unit of the autonomous mobile body is one of a cold-keeping unit or a warming unit.

13. The vehicle system according to claim 11, wherein the locker unit of the autonomous mobile body allows temperature to be adjusted separately for each of the plurality of sections.

14. The vehicle system according to claim 9, wherein the locker unit of the autonomous mobile body further includes a settlement unit configured to receive payment for the object that is housed.

15. The vehicle system according to claim 9, wherein the controller of the server apparatus calculates an amount of electric power that is consumed when the autonomous mobile body performs each of the first task and the second task.

16. The vehicle system according to claim 9, wherein the controller of the server apparatus instructs the autonomous mobile body to perform the operation, in a case where an amount of electric power that is consumed by the first task can be supplied by the first power source unit and an amount of electric power that is consumed by the second task can be supplied by the second power source unit.

* * * * *